United States Patent [19]

Datta et al.

[11] 4,389,441

[45] Jun. 21, 1983

[54] HIGH DENSITY INFORMATION RECORD LUBRICANTS

[75] Inventors: Pabitra Datta, Cranbury; Eugene S. Poliniak, Willingboro; Vladimir S. Ban, Princeton, all of N.J.

[73] Assignee: RCA Corporation, New York, N.Y.

[21] Appl. No.: 344,552

[22] Filed: Feb. 1, 1982

[51] Int. Cl.³ ............................ B32B 3/02; G11B 5/74
[52] U.S. Cl. ..................................... 428/65; 252/49.6; 369/286; 369/288; 428/64; 428/447; 428/451; 428/323; 428/522
[58] Field of Search ................... 428/447, 64, 65, 451, 428/900, 522, 408, 323; 252/49.6, 27, 28; 346/137, 76 L, 77 E, 135.1; 369/275, 276, 288, 286

[56] References Cited

U.S. PATENT DOCUMENTS

| | | | |
|---|---|---|---|
| 3,833,408 | 9/1974 | Matthies | 117/217 |
| 3,842,194 | 10/1974 | Clemens | 178/6.6 A |
| 4,275,101 | 6/1981 | Wang et al. | 369/286 |
| 4,327,140 | 4/1982 | Preston | 428/65 |
| 4,330,583 | 5/1982 | Datta | 428/65 |
| 4,340,629 | 7/1982 | Hillenbrand | 428/64 |
| 4,342,660 | 8/1982 | Berry | 428/65 |
| 4,346,468 | 8/1982 | Preston | 428/447 |
| 4,346,469 | 8/1982 | Hillenbrand | 369/286 |

*Primary Examiner*—Ellis P. Robinson
*Attorney, Agent, or Firm*—Birgit E. Morris

[57] ABSTRACT

High density information records comprising a conductive carbon-loaded polyvinylchloride record are lubricated with a fractionated methyl alkyl siloxane lubricant which contains at least two dopants in an amount sufficient to reduce sensitivity of the records to moisture.

3 Claims, No Drawings

HIGH DENSITY INFORMATION RECORD LUBRICANTS

This invention relates to improved high density information records. More particularly, this invention relates to lubricated high density information records wherein the lubricant contains two or more dopants.

BACKGROUND OF THE INVENTION

Clemens, in U.S. Pat. No. 3,842,194, has disclosed a system for recording and playback of information, including audio, video and color information, capacitively. The high density information record has signal information in the form of a surface relief pattern in an information track, e.g., a spiral groove, on the surface of the record. The record is made conductive with a metal layer, which acts as the first electrode of a capacitor, and then with a dielectric layer. The record is played back by means of a stylus electrode which is the second electrode of the capacitor. Since the record is rotated at a fairly high speed, on the order of 450 rpm, the friction between the stylus and the record surface may result in undue stylus wear. Thus, a lubricant is applied to the surface of the record.

A suitable class of lubricants has been described by Matthies in U.S. Pat. No. 3,833,408, herein incorporated by reference. These lubricants have the generic formula

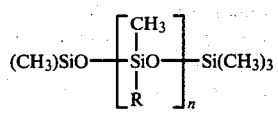

wherein R is an alkyl group of 4 to 20 carbon atoms and n is an integer.

Various improvements have been made to the record of Clemens including a record made from a conductive plastic which avoids the need for applying separate conductive metal and dielectric layers. Such a record may contain conductive particles for example. Improvement has also been made to the lubricant system. It has been found that when the lubricant is purified and fractionated, improved playback and storage stability results. The fractionated lubricant has the formula

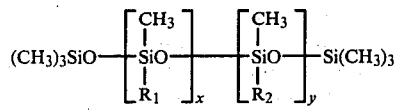

wherein $R_1$ and $R_2$ are alkyl groups of 4–20 carbon atoms, x is an integer of 2–4 and y is an integer of 0–2 and wherein the sum of x and y is 4 or less. The improved lubricant has better long term stability and improved first play performance and is described in U.S. Pat. No. 4,275,101 and also is herein incorporated by reference.

In an effort to still further improve the performance of video records, particularly to improve the resistance of the records to degradation from the effects of high temperatures and high relative humidity, the fractionated lubricant has been doped with several types of amines or quaternary ammonium salts, or silicon compounds. For example, Datta et al have disclosed the addition of hydroxylated amines to the fractionated lubricant to improve stability to moisture in copending application Ser. No. 231,857 filed Feb. 5, 1981 now U.S. Pat. No. 4,330,583; Wang et al have disclosed the addition of hydroxylated methylalkyldisiloxanes to the fractionated lubricant in copending application Ser. No. 231,859 filed Feb. 5, 1981, now U.S. Pat. No. 4,355,062; and Preston has disclosed the addition of an amino silane to the fractionated lubricant in copending application Ser. No. 231,750 also filed Feb. 5, 1981 now U.S. Pat. No. 4,327,140. Other dopants are also known.

The above doped lubricants perform excellently on the surface of the high density information records, but particularly well on those records which have been cleaned in aqueous solutions. It would be highly desirable to be able to provide lubricant systems that impart commercial quality readout for records exposed to a variety of environments without the need for precleaning the surface to remove contaminants.

SUMMARY OF THE INVENTION

We have found that a fractionated methyl alkyl siloxane lubricant that contains two or more dopant additives imparts synergistic effects with regard to high density information records' surface stability, which effects are produced both on cleaned and on as molded records.

DETAILED DESCRIPTION OF THE INVENTION

In order to obtain the improved results of the present invention, at least two lubricant additives having different surface characteristics will be added to the fractionated methyl alkyl siloxane lubricant which is now the standard in manufacture.

The lubricant additives of the invention are not the same chemically, but do have certain features in common; they act as barrier lubricants on the surface of the high density information records, they contain polar groups in their molecules and generally they have long chain alkyl groups. Some of them are compatible, i.e., soluble, in the fractionated methyl alkyl siloxane lubricants, but others are not. Some of them are water soluble, others will solubilize some of the impurities on the surface of the disc. In any event, they must have a surface tension that is at least as high as, and preferably higher than, that of the fractionated methyl alkyl siloxane lubricant. Materials that have a very low surface tension, for example, fluorinated surfactants, are not suitable for use herein.

Although we do not understand the theory or the mechanism involved herein, we can postulate that what is required is that the additives displace water at the record surface, thereby reducing the effects of high humidity at the surface, and also allow the fractionated lubricant to rewet the record surface uniformly and conformally. Also, different additives affect different surface properties, such as surface viscosity, surface elasticity, interfacial surface tension and surface energy of the records and a combination then can improve or make changes in several of these properties at the same time. Dopants suitable for use herein include at least one of the following: hydroxylated amines having the formula

wherein $R_3$ is hydrogen, lower alkyl or hydroxyalkyl; $R_4$ is $R_6A$ wherein $R_6$ is an alkyl group of 1–5 carbon atoms and A is hydroxyl or carboxyl; $R_5$ can be $R_7A$ wherein $R_7$ is a straight chain alkyl group of 1–10 carbon atoms and A has the meaning given above or, can be $R_7$ A-B-$R_8$ wherein $R_7$ and A have the meanings given above, B is a linking group which can be —O— or —C=C— and $R_8$ is an alkyl group of from about 6–25 carbon atoms. The hydroxylated amines can also be in the form of their corresponding quaternary salt as for example

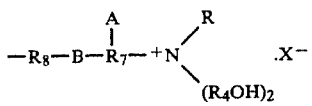

wherein $X^-$ can be a halogen, —$CH_3SO_4$ and the like. Mixtures of the amine and its quaternary salt can also be employed.

A second class of dopants that have been disclosed by Wang et al, described hereinabove, has the formula

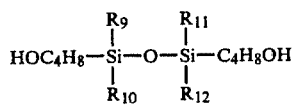

wherein $R_9$ and $R_{11}$ can be methyl or ethyl, preferably methyl; and $R_{10}$ and $R_{12}$ are linear long chain alkyl groups of up to about 20 carbon atoms.

A third class of dopants have a betaine structure and have the formula

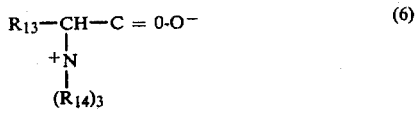

wherein $R_{13}$ is a long chain alkyl group from 10–20 carbon atoms and $R_{14}$ is a lower alkyl group of 1–5 carbon atoms. One of the above dopants can be mixed with another of the above dopants, or can be mixed with other known dopants.

The dopant additives can be dissolved in a solvent and applied to the surface of the records either in separate steps or mixed with a solution of the lubricant and applied together providing the solutions are miscible with each other. Preferably the fractionated methyl alkyl siloxane lubricant and the dopants are dissolved in a solvent mixture and applied in a single step to the surface of the record. The exact amount of additive is not critical and in general about 5 to 40 percent by weight of the lubricant of the combined additive will be effective.

The lubricant system of the present invention can be applied to conductive high density information records as they are pressed from the mold, which is preferable, or the conductive records can be cleaned first with an aqueous wash solution. The cleaning solution presently preferred is a 5 percent aqueous solution of a mixture containing 96.2 mol percent of an alcohol having the formula

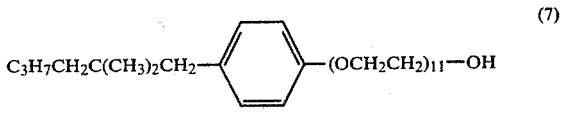

about 3.8 mol percent of 1,2-propanediol and a minor amount of triisopropanol amine. The cleaned records may be dried with a solvent such as 1,1,2-trifluoro-2,2,1-trichloroethane.

The invention will be further illustrated by the following Examples, but the invention is not meant to be limited to the details described therein. In the Examples parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 megahertz or below 3.1 megahertz in frequency, indicating a defect. Such defects are noted by the viewer as dropouts. The present acceptable level of carrier distress for a video record is 3 seconds in one hour of playback time.

EXAMPLE I

Mixtures of various known additives were made using 0.3 percent by weight of the fractionated methyl alkyl siloxane lubricant of Formula 2 above and 0.03 percent of the additives in an 80:20 mixture by volume of heptane and isopropanol.

Video records manufactured as described in Example 1 of copending application of Datta et al, described hereinabove, were employed.

One batch of records were played in their as-molded condition. Others were cleaned first by washing in the aqueous solution described above and dried in 1,1,2-trifluoro-2,2,1-trichloroethane.

The records were then stressed by storing for 24 hours in a chamber maintained at 100° F. and 95 percent relative humidity, and played again.

The data are summarized in Table 1, below, wherein the data is based on sets of 24 records and the carrier distress is given in seconds per 30 minutes of playback time. The control records were lubricated with the fractionated methyl alkyl siloxane lubricant in Formula 2, above, alone.

TABLE I

|  | Initial Play | | | After Stressing | | |
|---|---|---|---|---|---|---|
|  | Median | Range | No. Passed | Median | Range | No. Passed |
| Records, Washed | | | | | | |
| Control | 0.1 | 0–61 | 19/24 | 4.1 | 0.1–397 | 7/24 |
| Control + Dopant 1* | 0.1 | 0–0.6 | 24/24 | 2.1 | 0.1–65 | 10/24 |
| Control + Dopant 2** | 0.1 | 0–12 | 22/24 | 2.0 | 0.1–33 | 14/24 |
| Control + Dopant 1 | | | | | | |

TABLE I-continued

| | Initial Play | | | After Stressing | | |
|---|---|---|---|---|---|---|
| | Median | Range | No. Passed | Median | Range | No. Passed |
| and Dopant 2 | 0.1 | 0–321 | 22/24 | 2.1 | 0.1–49 | 10/24 |
| Records, as Molded | | | | | | |
| Control | 0.1 | 0–33 | 19/24 | 86 | 3.7–585 | 0/24 |
| Control + Dopant 1 | 0.1 | 0–77 | 16/24 | 8.4 | 0.3–145 | 3/24 |
| Control + Dopant 2 | 0.1 | 0–33 | 20/24 | 1.5 | 0.3–29 | 12/24 |
| Control + Dopant 1 and Dopant 2 | 0.1 | 0–2.4 | 23/24 | 0.6 | 0–200 | 17/24 |

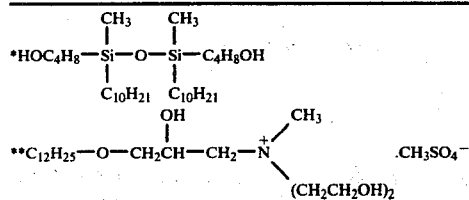

It is apparent that the double doping gave improved carrier distress results over the use of a single dopant for stressed records, particularly for as-molded records.

EXAMPLE II

The procedure of Example I was employed except using as the carbon black in the molding compound CSX-175B carbon black available from the Cabot Corporation. These data were compiled for sets of 12 records each.

TABLE II

| | Initial Play | | | After Stressing Once | | | After Stressing Twice | | |
|---|---|---|---|---|---|---|---|---|---|
| | Median | Range | No. Passed | Median | Range | No. Passed | Median | Range | No. Passed |
| Records, Washed | | | | | | | | | |
| Control | 0 | 0–2.4 | 12/12 | 5 | 0–124 | 4/12 | 8.2 | 2–66 | 2/12 |
| Control + Dopant 1 | 0 | 0–0.2 | 12/12 | 0.4 | 0–60 | 10/12 | 0.4 | 0–18.6 | 8/12 |
| Control + Dopant 2 | 0.2 | 0–2.2 | 12/12 | 0.6 | 0–9.2 | 9/12 | 1.0 | 0.2–1.8 | 12/12 |
| Control + Dopant 3*** | 0.6 | 0–1.4 | 12/12 | 1.0 | 0.2–5.4 | 10/12 | 0.4 | 0.2–16 | 9/12 |
| Control + Dopants 1 & 2 | 0 | 0–0.2 | 12/12 | 0.2 | 0–2.8 | 12/12 | 0.1 | 0–2.2 | 12/12 |
| Control + Dopants 1 & 3 | 0 | 0–0.4 | 12/12 | 0.2 | 0–36 | 11/12 | 0.2 | 0.1–3.8 | 11/12 |
| Records, as Molded | | | | | | | | | |
| Control | 0 | 0–0.1 | 12/12 | 104 | 18–524 | 0/12 | 64 | 22–306 | 0/12 |
| Control + Dopant 1 | 0 | 0–0.2 | 12/12 | 0.8 | 0–17.4 | 7/12 | 4.0 | 0.2–44 | 5/12 |
| Control + Dopant 2 | 0 | 0–0.2 | 12/12 | 0.4 | 0.2–2.0 | 12/12 | 0.6 | 0.2–4.6 | 11/12 |
| Control + Dopant 3 | 0.2 | 0–1.0 | 12/12 | 1.6 | 0.2–8.4 | 7/12 | 0.6 | 0.2–4.6 | 11/12 |
| Control + Dopants 1 & 2 | 0 | 0–0.2 | 12/12 | 0.4 | 0–4.6 | 11/12 | 1.2 | 0–5.8 | 11/12 |
| Control + Dopants 1 & 3 | 0 | 0–0.2 | 12/12 | 0.4 | 0.2–1.6 | 12/12 | 0.8 | 0.2–7.2 | 11/12 |

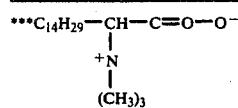

We claim:

1. In a high density information record adapted for use with a playback stylus to effect recovery of signals occupying a bandwidth of at least several megahertz when relative motion at a desired rate is established between said record and said stylus, said record comprising a disc of a conductive material containing an information track constituted by a surface relief pattern in said track to accommodate recovery of signals of said bandwidth upon establishment of relative motion at said rate, said record being coated with a methyl alkyl siloxane lubricant having the formula

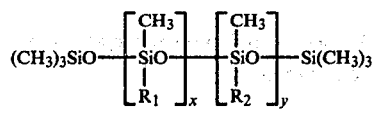

wherein $R_1$ and $R_2$ are alkyl groups of 4–20 carbon atoms, x is an integer of 2–4, y is an integer of 0–2 and wherein the sum of x and y is 4 or less, the improvement which comprises adding to said lubricant at least two dopants, at least one of which is selected from the following three classes having the formulas

wherein $R_3$ is hydrogen, lower alkyl or hydroxyalkyl; $R_4$ is $R_6A$ wherein $R_6$ is an alkyl group of 1–5 carbon atoms and A is hydroxyl or carboxyl; $R_5$ can be $R_7A$ wherein $R_7$ is a straight chain alkyl group of 1–10 carbon atoms and A has the meaning given above or can be $R_7A$-$B$-$R_8$ wherein $R_7$ and A have the above meaning, B is a linking group which can be —O— or —C≡C— and $R_8$ is an alkyl group of 6–25 carbon atoms, or their corresponding ammonium salt of the formula

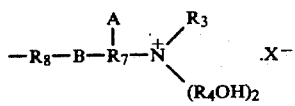

wherein $R_7$, $R_8$, A and B have the above meanings and X can be an anion;

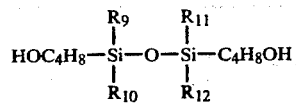

wherein $R_9$ and $R_{11}$ can be methyl or ethyl and $R_{10}$ and $R_{12}$ are long chain alkyl groups of up to 20 carbon atoms; and

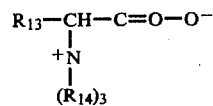

wherein $R_{13}$ is an alkyl group of 10–20 carbon atoms and $R_{14}$ is an alkyl group of 1–5 carbon atoms wherein said second dopant is of a different dopant class.

2. A record according to claim 1 wherein from about 5 to about 40 percent by weight of the methyl alkyl siloxane lubricant of the dopants is present.

3. A record according to claim 1 wherein said record is made of a conductive carbon-containing polymer or copolymer of polyvinylchloride.

* * * * *